(12) United States Patent
Civil et al.

(10) Patent No.: US 10,972,338 B2
(45) Date of Patent: Apr. 6, 2021

(54) PRE-POPULATING MEDIA ACCESS CONTROL (MAC) ADDRESS TABLES IN NETWORKS WHERE FLOODING OF MAC ADDRESSES IS BLOCKED

(71) Applicant: Ciena Corporation, Hanover, MD (US)

(72) Inventors: Geraldine Ruth Civil, Nepean (CA); Kevin Estabrooks, Nepean (CA); Gregory Vanderydt, Ottawa (CA); Jeffrey Randal Norman, Kanata (CA)

(73) Assignee: Ciena Corporation, Hanover, MD (US)

( * ) Notice: Subject to any disclaimer, the term of this patent is extended or adjusted under 35 U.S.C. 154(b) by 35 days.

(21) Appl. No.: 16/202,258

(22) Filed: Nov. 28, 2018

(65) Prior Publication Data

US 2020/0169498 A1    May 28, 2020

(51) Int. Cl.
*H04L 12/24* (2006.01)
*H04L 29/12* (2006.01)
*H04L 12/751* (2013.01)

(52) U.S. Cl.
CPC .......... *H04L 41/0803* (2013.01); *H04L 41/08* (2013.01); *H04L 41/0806* (2013.01); *H04L 45/025* (2013.01); *H04L 61/6022* (2013.01)

(58) Field of Classification Search
CPC ......... H04L 29/00; H04L 29/02; H04L 29/10; H04L 41/00; H04L 41/08–0806; H04L 41/0813; H04L 41/0876; H04L 41/0886; H04L 45/00; H04L 45/02; H04L 45/025; H04L 45/26; H04L 45/85; H04L 61/00; H04L 61/6022
See application file for complete search history.

(56) References Cited

U.S. PATENT DOCUMENTS 5,802,316 A * 9/1998 Ito .................. H04L 12/4612
                                                370/351
6,028,862 A * 2/2000 Russell ............ H04L 12/5692
                                                370/397

(Continued)

OTHER PUBLICATIONS

"OAM Messages", Technical Documentation, Juniper Networks (Year: 2014).*

(Continued)

*Primary Examiner* — Boris D Grijalva Lobos
(74) *Attorney, Agent, or Firm* — Clements Bernard Walker; Lawrence A. Baratta, Jr.; Christopher L. Bernard (57) ABSTRACT

Systems and methods include, in a node having a plurality of Media Access Control (MAC) addresses with a source MAC address for an application and with the node connected to Network Termination Equipment (NTE) having flooding disabled, configuring the node to periodically send a packet to the NTE with the source MAC address for the application to pre-populate a forwarding database in the NTE; and transmitting the packet to the NTE periodically such that the NTE receives the packet and installs the source MAC address in its forwarding database for reachability thereto despite the disabled flooding. The plurality of Media Access Control (MAC) addresses can include a chassis MAC address and the source MAC address for the application. The packet can be a no-operation packet which requires no processing by the NTE except installation of the source MAC address for the application.

20 Claims, 9 Drawing Sheets

(56) References Cited

U.S. PATENT DOCUMENTS

| | | | | |
|---|---|---|---|---|
| 6,493,318 B1* | 12/2002 | Bare | ........................ | H04L 45/02 370/238 |
| 6,556,541 B1* | 4/2003 | Bare | ...................... | H04L 12/185 370/235 |
| 6,631,136 B1* | 10/2003 | Chowdhury | ............ | H04L 45/02 370/395.31 |
| 6,757,279 B1* | 6/2004 | Furlong | .............. | H04L 12/4641 370/387 |
| 6,804,232 B1* | 10/2004 | Donaghey | ................ | H04L 12/66 370/389 |
| 6,950,438 B1* | 9/2005 | Owen | ...................... | H04L 69/12 370/409 |
| 6,973,543 B1* | 12/2005 | Hughes | .................. | G06F 12/082 709/213 |
| 7,093,027 B1* | 8/2006 | Shabtay | .............. | H04L 12/4633 370/216 |
| 7,660,259 B1* | 2/2010 | Grosser | ................... | H04L 45/00 370/252 |
| 7,831,745 B1* | 11/2010 | Eiriksson | ................ | G06F 13/28 710/22 |
| 8,462,774 B2* | 6/2013 | Page | ..................... | H04L 45/245 370/369 |
| 9,055,000 B1* | 6/2015 | Ghosh | ..................... | H04L 45/66 |
| 9,148,389 B2* | 9/2015 | Jacob Da Silva | ...... | H04L 45/58 |
| 9,407,643 B1* | 8/2016 | Bavington | .......... | H04L 63/1408 |
| 10,012,811 B2 | 7/2018 | Rivaud et al. | | |
| 2002/0027906 A1* | 3/2002 | Athreya | .............. | H04L 12/4645 370/386 |
| 2002/0073338 A1* | 6/2002 | Burrows | ............. | H04L 41/0213 726/13 |
| 2002/0103948 A1* | 8/2002 | Owen | ................. | G06F 13/4243 710/33 |
| 2003/0053427 A1* | 3/2003 | Kanda | ..................... | H04W 8/14 370/328 |
| 2003/0142685 A1* | 7/2003 | Bare | .................. | H04L 67/1002 370/410 |
| 2004/0264466 A1* | 12/2004 | Huang | .................. | H04L 45/123 370/392 |
| 2005/0099949 A1* | 5/2005 | Mohan | .................... | H04L 47/10 370/236.2 |
| 2005/0099951 A1* | 5/2005 | Mohan | ................ | H04L 43/0811 370/241 |
| 2005/0099952 A1* | 5/2005 | Mohan | .................... | H04L 41/04 370/241 |
| 2005/0198357 A1* | 9/2005 | Fujita | .................. | H04L 12/2807 709/232 |
| 2007/0002756 A1* | 1/2007 | Hidle | ........................ | H04L 1/24 370/244 |
| 2007/0064700 A1* | 3/2007 | Holness | .................. | H04L 12/42 370/392 |
| 2007/0127388 A1* | 6/2007 | Mack-Crane | ....... | H04L 43/0811 370/252 |
| 2007/0171918 A1* | 7/2007 | Ota | ..................... | H04L 12/2856 370/395.53 |
| 2007/0201490 A1* | 8/2007 | Mahamuni | .......... | H04L 12/4625 370/395.54 |
| 2007/0230457 A1* | 10/2007 | Kodera | ............... | H04L 12/4679 370/389 |
| 2008/0144514 A1* | 6/2008 | Yan | ................... | H04L 29/12028 370/241.1 |
| 2008/0165864 A1* | 7/2008 | Eleftheriadis | .. | H04N 21/234327 375/240.29 |
| 2008/0219172 A1* | 9/2008 | Mohan | ................ | H04L 12/4625 370/241.1 |
| 2008/0219268 A1* | 9/2008 | Dennison | ............ | H04L 47/2425 370/395.2 |
| 2009/0116404 A1* | 5/2009 | Mahop | ................ | H04L 41/0213 370/254 |
| 2009/0201819 A1* | 8/2009 | Mizutani | ............... | H04L 12/185 370/241.1 |
| 2009/0210519 A1* | 8/2009 | Zill | ......................... | H04L 12/12 709/220 |
| 2010/0318667 A1* | 12/2010 | Miller | ..................... | H04L 67/02 709/228 |
| 2011/0058560 A1* | 3/2011 | Okita | .................. | H04L 12/4637 370/395.53 |
| 2012/0213211 A1* | 8/2012 | Remaker | ............. | H04L 63/0421 370/338 |
| 2013/0259037 A1* | 10/2013 | Natarajan | ............. | H04L 43/026 370/390 |
| 2014/0056298 A1* | 2/2014 | Vobbilisetty | ............ | H04L 12/46 370/355 |
| 2015/0109923 A1* | 4/2015 | Hwang | ................... | H04L 47/12 370/235 |
| 2015/0207668 A1 | 7/2015 | Civil et al. | | |
| 2017/0048167 A1* | 2/2017 | York | ..................... | G06F 13/385 |
| 2017/0214516 A1 | 7/2017 | Rivaud et al. | | |

OTHER PUBLICATIONS

"VLAN and its Applications", DrayTek Australia (Year: 2016).*
Stretch et al., "Blocking Unknown Unicast Flooding", PacketLife.net (Year: 2010).*

* cited by examiner

PRE-POPULATING MEDIA ACCESS CONTROL (MAC) ADDRESS TABLES IN NETWORKS WHERE FLOODING OF MAC ADDRESSES IS BLOCKED

FIELD OF THE DISCLOSURE

The present disclosure generally relates to networking. More particularly, the present disclosure relates to systems and methods for pre-populating Media Access Control (MAC) address tables in networks where flooding of MAC addresses is blocked.

BACKGROUND OF THE DISCLOSURE

The foundation of efficient bidirectional packet service transport across a layer 2 network involves forwarding of Ethernet frames towards known or learned unicast MAC addresses assigned to customer application or communication devices connected to the edge of layer 2 transport networks. MAC address reachability is essential for communication and, for security reasons, Ethernet service access ports are often subject to layer 2 transport device access restrictions such that only authorized customer equipment, as identified by MAC address, may communicate across the network. Layer 2 transport devices (network elements) are often equipped with features enabling access lists and anti-spoofing functionality to improve network security by controlling admission of traffic to the network based upon ethernet frame MAC addresses. This comes with a Capital Expense (CAPEX) consideration in that packet transport gear that is well equipped with such control list functionality at high scale/performance drives elevated product cost, and the maintenance of related MAC access lists comes with an Operating Expense (OPEX) cost/consideration.

Typical Ethernet forwarding behavior for unknown unicast traffic (where the destination MAC address has not yet been learned nor configured), is to flood the traffic out all ports belonging to the layer 2 forwarding domain. This flooding will occur until traffic from the destination is received and the source MAC address of the traffic received is learned along with its source port and added to the forwarding database\table. So long as this binding is in place, the layer 2 transport device will forward traffic to the destination mac address only via the port on which the destination mac address was learned against. One low-cost mechanism to implement a level of network security is to restrict flooding of packets with an unknown unicast MAC within service provider networks. Most commonly, flooding of such packets may be restricted such that is only permitted in one direction, for example, in the User-Network Interface (UNI)→Network-Network Interface (NNI) direction only and do not allow flooding in the NNI→UNI direction.

The present disclosure addresses the situation where packet flooding is restricted such as with the unknown unicast MAC within service provider networks. This configuration inhibits devices (network elements) from MAC learning because the devices do not get flooded packets. The present disclosure also addresses the situation where a Customer Premises Equipment (CPE)/Network Interface Device (NID) includes multiple MAC addresses such as a chassis MAC and one or more application MAC. Existing solutions include the following. First, test traffic can be encapsulated with alternate classification criteria, such as push/pop of a temporary Virtual Local Area Network (VLAN) tag or header, and modify Network Termination Equipment (NTE) to apply unicast flooding behavior based upon this classification criteria. However, this classification for special traffic handling is generally regarded as a security threat that can be exploited maliciously. Second, static MAC entries can be manually configured in a forwarding table to resolve forwarding of unicast traffic, for example, destined to CPE/NID via a port on NTE to which the CPE/NID is connected. This extends to a list of addresses should there be multiple CPE/NIDs on the NTE side of the network and if these CPE/NIDs are not directly connected to the UNI of NTE. However, this approach has increased maintenance, OPEX, and error consideration related to maintenance of a list of CPE/NID end-station MAC addresses per NTE UNI.

However, Rapid Spanning Tree Protocol (RSTP)/Link Layer Discovery Protocol (LLDP)/etc. will not pre-populate the correct MAC into the NTE tables (these protocols will use the chassis MAC as their source MAC, not the application's MAC. Also, the CPE/NID can include several applications each with its own MAC, but RSTP (or other layer 2 protocols) could only use one of these MACs as its source MAC. Also, some devices may have whatever layer 2 protocol is chosen (e.g., RSTP) disabled. Third, an Internet Protocol (IP) ping can be used prior to starting an application. Note, the ping (echo request) packets would need to bear the application's MAC address as their source MAC, not the chassis (or port-based) MAC address. This has the shortcoming that it requires the network to be fully IP capable (the network may be layer 2 only). Also, it requires the configuration of a separate IP interface for each application. For example, application A would need IP address A.A.A.A (associated with MAC A), and application B would require IP address B.B.B.B (associated with MAC B). Devices may be limited in the number of IP interfaces they can have configured, and there might be a large number of applications, each with their own MAC, which would then each need their own IP address associated with the application MAC address.

Fourth, a central orchestrator can be used to be populated with application MAC addresses for the push to NTEs or use of a central orchestrator to learn CPE/NID application MAC addresses and push them to NTE devices. Comprehensive and granular orchestration\telemetry requires an investment in server/solution and operations that is not practical in certain categories of packet transport network operations.

BRIEF SUMMARY OF THE DISCLOSURE

In an embodiment, a method includes, in a node having a plurality of Media Access Control (MAC) addresses with a source MAC address for an application and with the node connected to Network Termination Equipment (NTE) having flooding disabled, receiving a configuration for transmission of one or more packets with the source MAC address to the NTE to enable the NTE to learn the source MAC address in a forwarding database in the NTE; and transmitting the one or more packets to the NTE such that the NTE receives the packets and learns the source MAC address in its forwarding database for reachability thereto. The plurality of Media Access Control (MAC) addresses can include a chassis MAC address and the source MAC address for the application. The packet can be a no-operation packet which requires no processing by the NTE except installation of the source MAC address for the application. The packet can be sent at least every time T where time T is an age out time for entries in the forwarding database. The packet can further include classification fields based on the application including a Virtual Local Area Network Identifier (VID). The packet can be an Address Resolution Protocol (ARP)

probe with arbitrary Internet Protocol (IP) addresses. The packet can be an existing layer 2 broadcast or multicast protocol packet with a vendor-specific operations code. The packet can be Link Layer Discovery Protocol (LLDP) frame with a Type-Length-Value (TLV) to advertise the source MAC address for the application. The packet can be an Ethernet protocol packet with a dedicated Ethertype for pre-populating the source MAC address for the application.

In another embodiment, a node includes one or more ports including a port connected to Network Termination Equipment (NTE) having flooding disabled; a switching fabric between the one or more ports; and a controller including a forwarding database, wherein the node has a plurality of Media Access Control (MAC) addresses with a source MAC address for an application, and wherein the controller is configured to, responsive to the application, cause transmission of one or more packets with the source MAC address to the NTE to enable the NTE to learn the MAC address in its forwarding database. The plurality of Media Access Control (MAC) addresses can include a chassis MAC address and the source MAC address for the application. The packet can be a no-operation packet which requires no processing by the NTE except installation of the source MAC address for the application. The packet can be sent at least every time T where time T is an age out time for entries in the forwarding database. The packet can further include classification fields based on the application including a Virtual Local Area Network Identifier (VID). The packet can be an Address Resolution Protocol (ARP) probe with arbitrary Internet Protocol (IP) addresses. The packet can be an existing layer 2 broadcast or multicast protocol packet with a vendor-specific operations code. The packet can be Link Layer Discovery Protocol (LLDP) frame with a Type-Length-Value (TLV) to advertise the source MAC address for the application. The packet can be an Ethernet protocol packet with a dedicated Ethertype for pre-populating the source MAC address for the application.

In a further embodiment, a Network Termination Equipment (NTE) device includes one or more ports including a port connected to a node, wherein flooding is disabled on the port, and wherein the node has a plurality of Media Access Control (MAC) addresses with a source MAC address for an application; a switching fabric between the one or more ports; and a controller including a forwarding database, and wherein the controller is configured to receive one or more packets with the source MAC address from the node to enable the NTE to record the learn MAC address in its forwarding database, and install the source MAC address for the application to pre-populate a forwarding database in the NTE. The controller can be further configured to periodically receive the one or more packets as the source MAC address for the application ages out.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for pre-populating Media Access Control (MAC) address tables in networks where flooding of MAC addresses is blocked and where a CPE/NID has multiple MAC addresses such as a chassis MAC and one or more application MACs. Again, the flooding of unknown Unicast MAC addresses is disabled such as for a security measure. The systems and methods avoid the aforementioned limitations described herein and can be used in a client-server application with the configuration at only one device. The systems and methods include periodic forwarding database primer packets using standard Ethernet broadcast/multicast forwarding technology and application source MAC address to ensure that valuable layer 2 diagnostic and service level agreement compliance tests between known CPE/NIDs in the network remain possible despite disabling unicast flooding at service UNI. In an embodiment, the systems and methods reuse Ethernet broadcast packets already defined by standards, but for the purpose of forwarding database priming and not for the purpose specified by their respective standards. Advantageously, the systems and methods provide the automatic population of NTE MAC forwarding tables with known CPE\NID MAC addresses without a need for flooding unicast frames, nor maintenance of static lists of MAC addresses per NTE device.

Network

Figure 1:
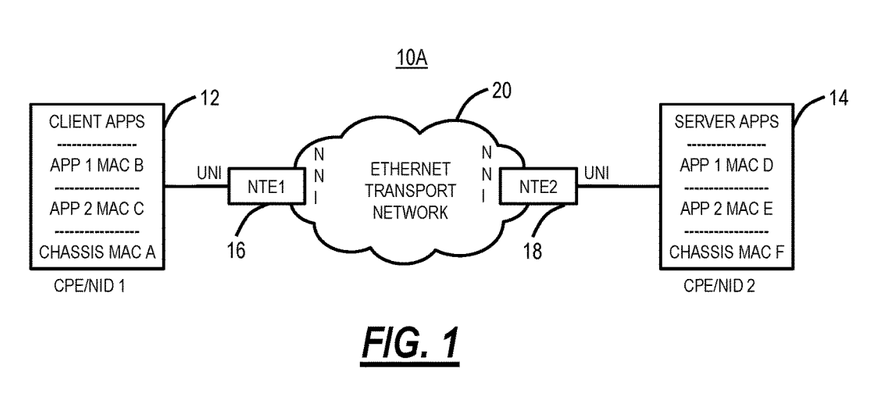
FIG. 1 is a network diagram of a network with Customer Premises Equipment (CPE)/Network Interface Devices (NIDs) directly connected to Network Termination Equipment (NTE) which are connected to one another via an Ethernet transport network.
Figure 2:
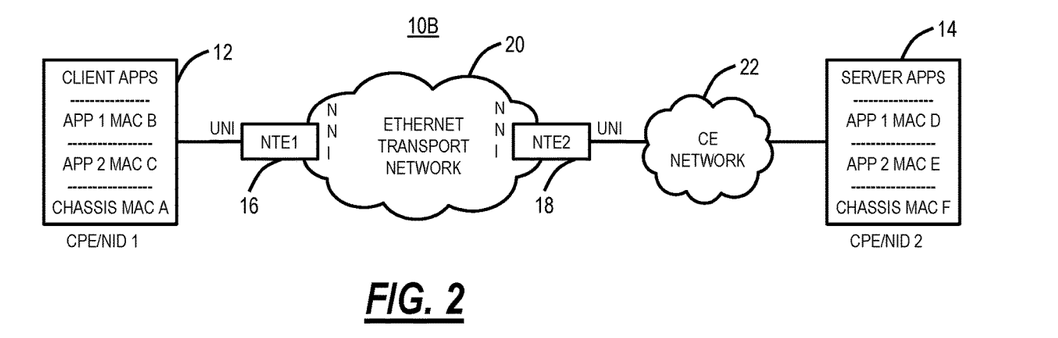
FIG. 2 is a network diagram of a network with the CPE/NID connected to the NTE via a Customer Edge Ethernet network.
Figure 3:
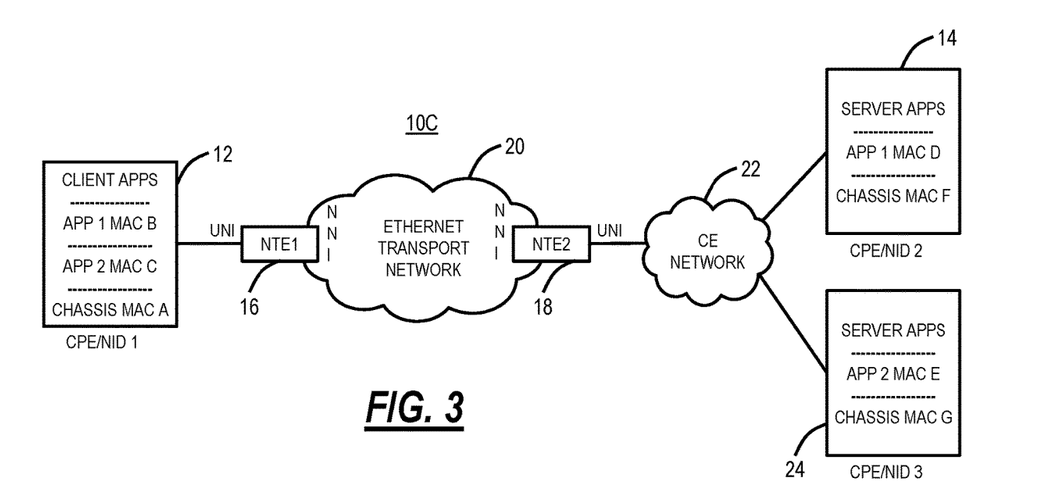
FIG. 3 is a network diagram of a network with CPE/NIDs having a distributed server application and connected to the NTE via the Customer Edge Ethernet network.

FIG. 1 is a network diagram of a network 10A with CPE/NIDs 12, 14 directly connected to NTEs 16, 18 which are connected to one another via an Ethernet transport network 20. FIG. 2 is a network diagram of a network 10B with the CPE/NID 14 connected to the NTE 18 via a Customer Edge Ethernet network 22. FIG. 3 is a network diagram of a network 10C with CPE/NIDs 14, 24 having a distributed server application and connected to the NTE 18 via the Customer Edge Ethernet network 22. Each of the networks 10A, 10B, 10C illustrate an example deployment for the systems and methods. Other deployments are also contemplated. The networks 10A, 10B, 10C include the CPE/NID 12 which is designated as a client device and the CPE/NID 14 which is designated as a server device for a client/server application. The CPE/NID 12 is configured to communicate with the CPE/NID 14. The CPE/NID 12 is connected to a UNI port of the NTE 16, the CPE/NID 14 is ultimately connected to a UNI port of the NTE 18. In the network 10A, the CPE/NID 14 is directed connected to the UNI port of the NTE 18. In the network 10B, the CPE/NID 14 is ultimately connected to the UNI port of the NTE 18 via the Customer Edge Ethernet network 22. In the network 10C, the client/server application has distributed server applications on the CID/NPEs 14, 24 which ultimately connected to the UNI port of the NTE 18 via the Customer Edge Ethernet network 22. The NTEs 16, 18 are connected to one another via NNI ports over the Ethernet transport network 20.

With unknown Unicast MAC flooding disabled as described herein, network demarcation or customer premise transport gear (CPE/NID 12) on one side of the network 10A, 10B, 10C cannot reach similar equipment (CPE/NID 14, 24) on the other side of the network, unless the CPE/NID 14, 24 first sends traffic to allow its MAC address to be learned (with the connected UNI port) on its local Layer 2 transport device (NTE 18). In client/server applications, for example, this achieves a coarse level of admission control security where a server application on one side of the network must know to send a primer packet to achieve unicast communication before client applications are able to reach that server. This, however, comes with a cost and consequence related to layer 2 reachability and benchmark test tools.

In various embodiments, the CPE/NIDs 12, 14, 24 include multiple MAC addresses including a chassis MAC and one or more application MACs. That is, the CPE/NIDs 12, 14, 24 are network elements with multiple MAC addresses. For example, the CPE/NID 12 has a chassis MAC A and two applications with associated MACs B, C. The CPE/NID 14 has a chassis MAC F and two applications with associated MACs D, E in the networks 10A, 10B and one application with associated MAC D in the network 10C. The CPE/NID 24 has a chassis MAC G and one application with associated MAC E in the network 10C.

Assume that both the CPE/NIDs 12, 14, 24 are configured to use standard layer 2 protocols such as RSTP, LLDP, etc., then it can be assumed that as these devices autonomously transmit Bridge Protocol Data Units (BPDUs), their chassis (or port-based) MACs (A and F) will get populated in the NTEs 16, 18 associated MAC table. However, if the CPE/NIDs 12, 14, 24 do not run any of these common protocols then the chassis (or port-based) MACs of A and F will not be populated in the NTEs 16, 18 MAC tables, and the first time the CPE/NID 12 needs to send a frame specifically to CPE/NID 14 (using CPE/NID 14's chassis MAC F) that packet will reach the NTE 18, but since the NTE 18 will not permit flooding of unknown unicast frames in the NNI→UNI direction, that frame will fail to reach the CPE/NID 14.

Note, this scenario is unlikely as there are few devices that will not participate in at least one layer 2 protocol that will cause them to autonomously send multicast or broadcast frames bearing their chassis (or port-based) MAC as a source MAC address. However, this problem is significant where the CPE/NIDs 12, 14, 24 have more than one MAC address.

The CPE/NID 12, 14, 24 devices may support many client/server type applications which require the use of a MAC address that is specific to that application. Examples of such applications exist on packet networking devices, including Benchmark and Ethernet Virtual Circuit (EVC) Ping. Such MAC addresses, being specific to the application, will not have been used as a source MAC for any BPDU frames that have been generated by the CPE/NID 12, 14, 24 devices. Therefore, these MAC addresses will not be present in the MAC tables on either of the NTEs 16, 18. Furthermore, the application in many cases could be running over a separate Ethernet service (such as a VLAN) than the layer 2 protocol BPDUs.

Using the Benchmark application as an example, the CPE/NID 12 may function as a Benchmark generator, which initiates a test session to the Benchmark reflector present on the CPE/NID 14. The Benchmark reflector's MAC D will have been configured by the user on the Generator end. As the first test frame leaves the generator, the generator's MAC B will be learned on the NTE 16, 18 devices, but as this is the first frame sent by the generator, MAC D is not present in the NTE 16, 18 MAC tables, and when the frame reaches the NTE 18 it will not be forwarded to the Benchmark reflector on the CPE/NID 14, because MAC D is an unknown unicast MAC and the NTE 16 will not flood unknown unicast frames over its UNI ports, as described herein.

The systems and methods provide a mechanism to pre-populate MAC D (or any other MAC address) in the NTE 16, 18 MAC tables prior to the CPE/NID 12 sending the first application frame. This mechanism is most beneficial if the CPE/NID 14 is either directly connected to the NTE 18 or connected to the NTE 18 across a subtending customer layer 2 network, i.e., the Customer Edge Ethernet network 22.

Pre-Populating MAC Addresses

The systems and method provide three example solutions to address the problem statement. The first approach includes an Address Resolution Protocol (ARP) probe and involves a change to the CPE/NID 12, 14 only. The second approach is a more generic solution useful to IP unaware networks which reuse existing layer 2 broadcast or multicast protocol packets and involves a change to the CPE/NID 12, 14 only. The third approach proposes changes to the CPE/NID 12, 14 as well as to the NTE 16, 18. Each of these approaches are implemented at the CPE/NID 14, 24 when a server application is executed for purpose of ensuring the associated MAC addresses (MACs D, E, F, G) are installed and remain on the NTE 18. This allows the CPE/NID 12 to execute the corresponding applications with its MAC addresses (MAC A, B, C) and reach the CPE/NID 14 via the NTEs 16, 18 despite the fact MAC flooding is disabled. These approaches are automatically performed based on the server application execution, avoiding any need to configure the CPE/NID 14, 24 or the NTE 18.

In the following descriptions, the various processes are described with reference to the CPE/NID 14 executing a server application with the MAC D to pre-populate the MAC D in the MAC table in the NTE 16.

ARP Probe

Figure 4:
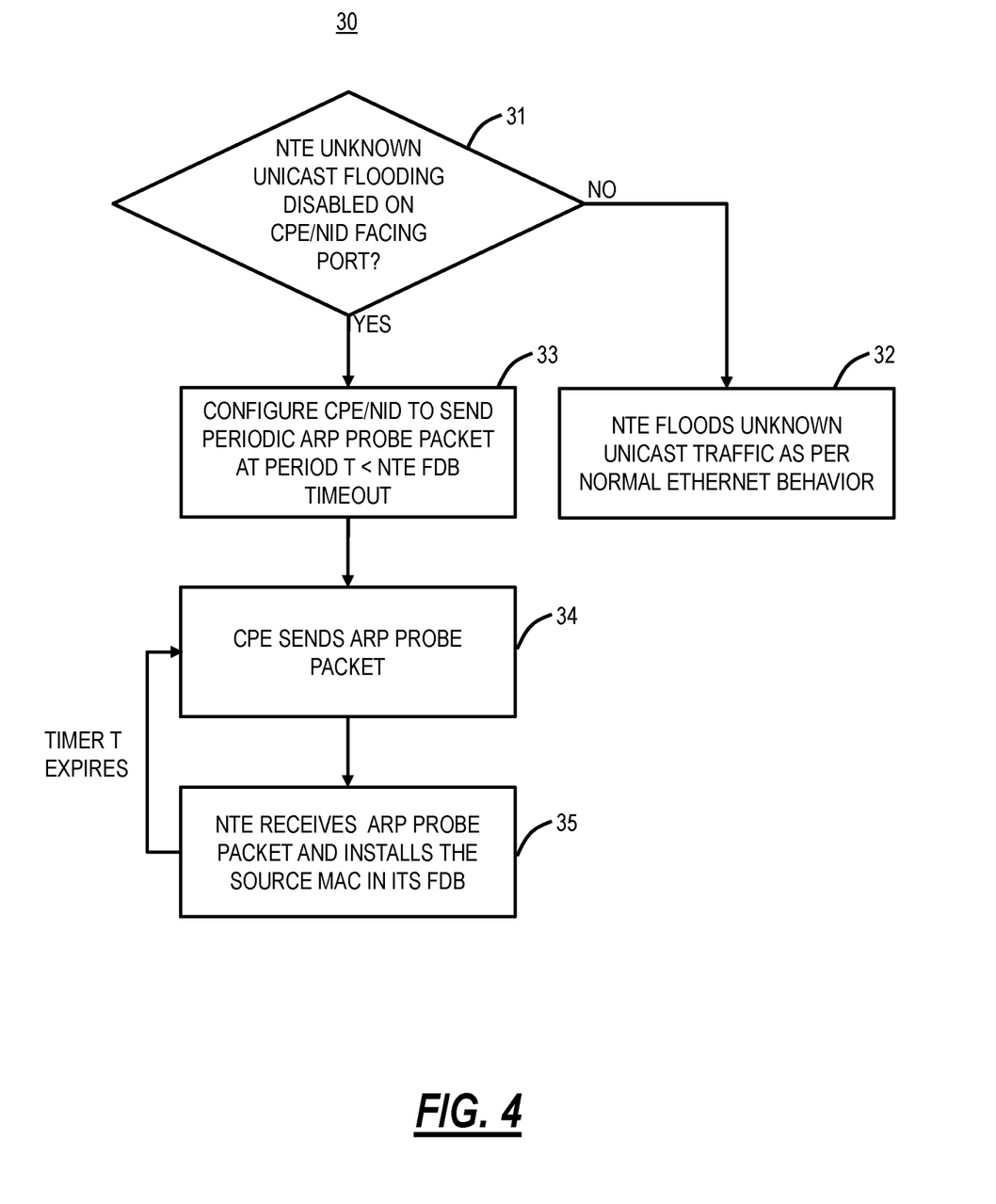
FIG. 4 is a flowchart of a process utilizing an Address Resolution Protocol (ARP) probe to pre-populate the MAC table.

FIG. 4 is a flowchart of a process 30 utilizing an ARP probe to pre-populate the MAC table. The process 30 includes reuse and application of an ARP probe as a packet to pre-populate the MAC address table of the NTE enabling unicast transport to the CPE/NID. The ARP probe is described in RFC 826, "An Ethernet Address Resolution Protocol," November 1982, RFC 3927, "Dynamic Configuration of IPv4 Link-Local Addresses," May 2005, and RFC 5227, "IPv4 Address Conflict Detection," July 2008, the contents of each are incorporated herein by reference. An ARP probe provides a technique to detect IP address conflicts. The process 30 utilizes a so-called gratuitous ARP probe which is a request/reply that is not normally needed according to the ARP specification (RFC 826). The gratuitous ARP probe can be an ARP request packet where the source and destination IP are irrelevant since the purpose of the packet is simply to get its source MAC populated into the MAC tables along with the receiving NTE device(s) UNI port. There is no intent to use ARP for the purpose of learning the MAC address of a target IP address. The gratuitous ARP probe utilized herein requires no processing on the NTE device other than installing the source MAC address in the forwarding database (MAC table).

The process 30 includes determining if NTE unknown unicast flooding is disabled on a CPE/NID facing port (step 31), and, if not, the NTE floods unknown unicast traffic as per normal Ethernet behavior (step 32), i.e., there is no need for the ARP probe. If unknown unicast flooding is disabled (step 31), the process 30 includes configuring the CPR/NID to send periodic ARP probe packets at a period T (T is a time value) which is less than the NTE forwarding database (FDB) timeout (step 33). Here, when the application requiring an application specific MAC address is enabled, the application sends periodic ARP probe packets using the CPE/NID application MAC as the source MAC, and any other fields that matches the classification criteria of the CPE/NID application's service (for example, a specific VLAN ID (VID)) (step 34). The process 30 includes the NTE receiving the ARP probe packet and installing the source MAC in its FDB (step 35). The steps 34, 35 are repeating every T time.

The following depicts the contents of an example of an ARP Probe frame for an untagged service.

---

Ethernet II, Src: ec:b0:e1:82:f6:25, Dst: Broadcast (ff:ff:ff:ff:ff:ff)
Address Resolution Protocol (Request)
   Hardware Type: Ethernet (1)
   Protocol type: IP (0x0800)
   Hardware size: 6
   Protocol size: 4
   Opcode: request (1)
   Sender MAC address: ec:b0:e1:82:f6:25
   Sender IP address: 0.0.0.0
   Target MAC address: 00:00:00:00:00:00
   Target IP address; 192.168.1.1

---

Existing L2 Broadcast or Multicast Protocol

Figure 5:
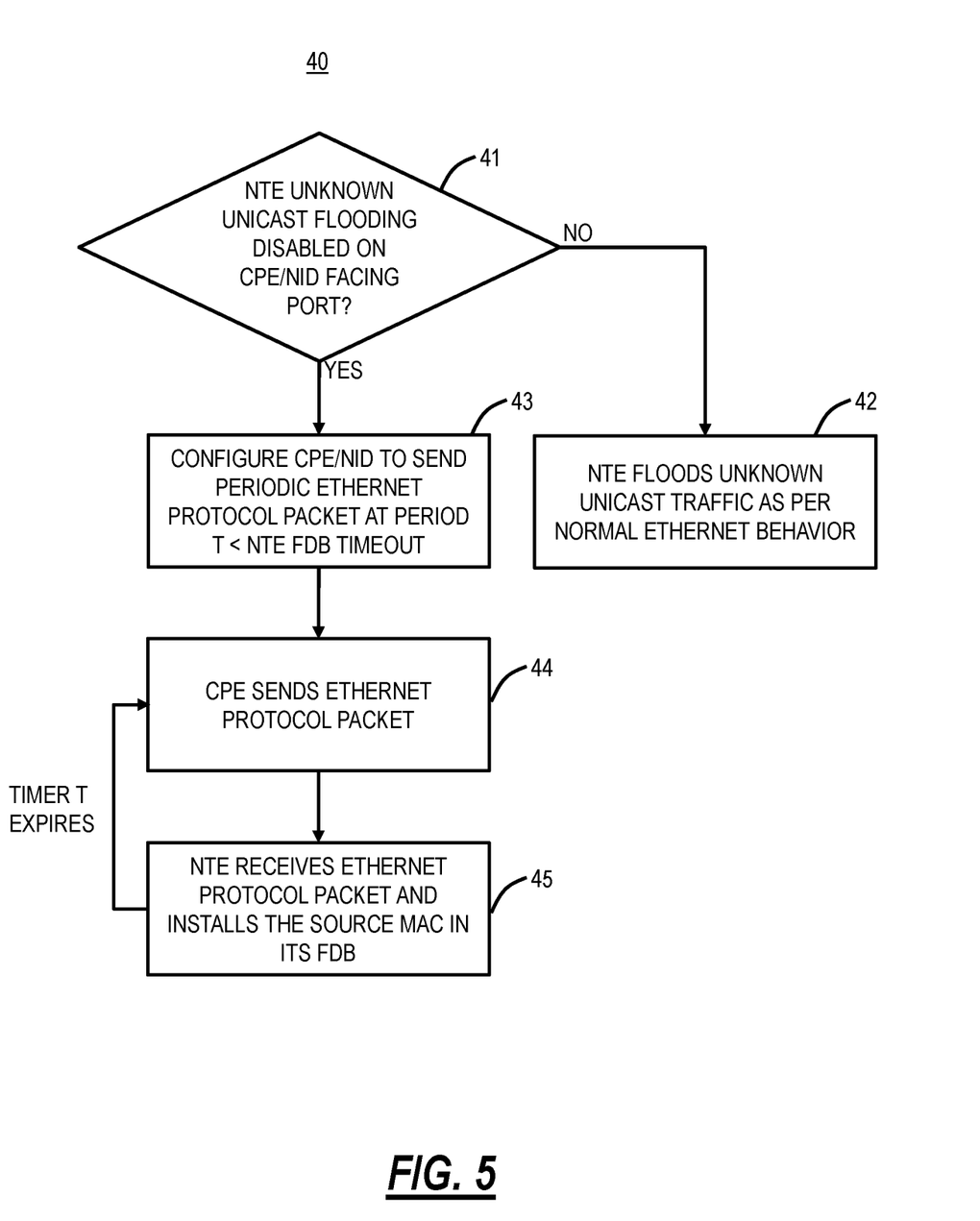
FIG. 5 is a flowchart of a process utilizing an existing layer 2 broadcast or multicast protocol to pre-populate the MAC table.

FIG. 5 is a flowchart of a process 40 utilizing an existing layer 2 broadcast or multicast protocol to pre-populate the MAC table. The process 40 utilizes an existing layer 2 broadcast or multicast protocol packet that would have the application MAC address of the CPE/NID populated in the protocol packet as the Ethernet source MAC address and a broadcast or multicast ethernet destination MAC address. Again, when Unicast flooding is disabled on a port on the NTE, the subtending CPE/NID must be configured such that when an application requiring an application specific MAC address is enabled, the application sends periodic existing layer 2 protocol packets using the CPE/NID application MAC as the source MAC, and any other fields that match the classification criteria of the CPE/NID application's service (for example, a specific VID). Whatever these frames are, they must effectively engender no action on the NTE nodes (or any other nodes in the network) other than to populate the source MAC in the NTE MAC table. In other words, they should be some sort of "no-op" (no operation) frame so that there is no processing based on the existing layer 2 broadcast or multicast protocol packets other than MAC installation.

The process 40 includes determining if NTE unknown unicast flooding is disabled on a CPE/NID facing port (step 41), and, if not, the NTE floods unknown unicast traffic as per normal Ethernet behavior (step 42), i.e., there is no need for the existing layer 2 broadcast or multicast protocol packet. If unknown unicast flooding is disabled (step 41), the process 40 includes configuring the CPE/NID to send periodic existing layer 2 broadcast or multicast protocol packets at a period T (T is a time value) which is less than the NTE forwarding database (FDB) timeout (step 43). Here, when the application requiring an application specific MAC address is enabled, the application sends periodic existing layer 2 broadcast or multicast protocol packets using the CPE/NID application MAC as the source MAC, and any other fields that matches the classification criteria of the CPE/NID application's service (for example, a specific VLAN ID (VID)) (step 44). The process 40 includes the NTE receiving the existing layer 2 broadcast or multicast protocol packet and installing the source MAC in its FDB (step 45). The steps 44, 45 are repeating every T time. An example of potentially useful existing layer 2 broadcast or multicast protocol packet could include an Ethernet Operations, Administration, and Maintenance (EOAM) with a vendor-specific OpCode (operations code). For example, the EOAM frame can be any type of frame, and the vendor-specific Op Code can cause the frame to be a no-op frame.

Also, the systems and methods could include an extension of an existing protocol by adding Type-Length-Value (TLVs) to existing layer 2 protocols for the purpose of delivering a list of relevant application source MAC addresses to the NTE for installation to its FDB. An example of extending an existing protocol would be the use of an LLDP frame extended with a new TLV to advertise application MAC addresses.

Figure 6:
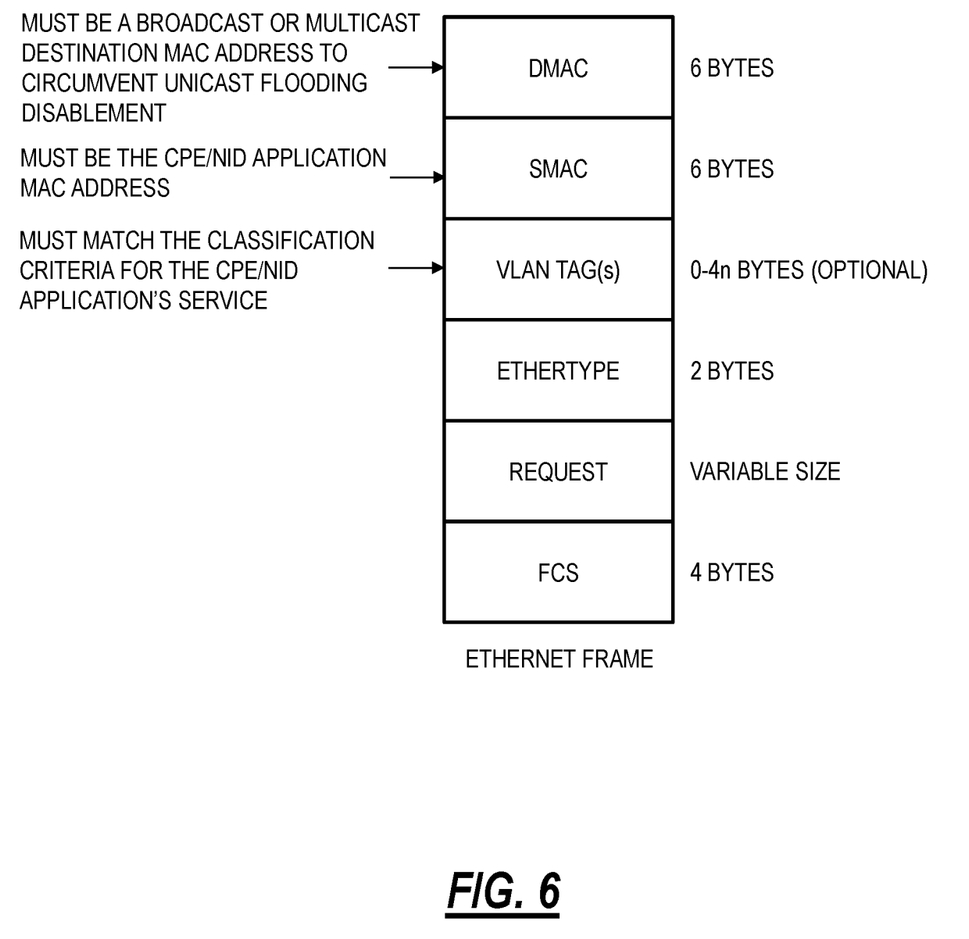
FIG. 6 is a block diagram of an existing layer 2 broadcast or multicast protocol packet for use with the process of FIG. 5.

FIG. 6 is a block diagram of an existing layer 2 broadcast or multicast protocol packet for use with the process 40. The existing layer 2 broadcast or multicast protocol packet includes a Destination MAC address (DMAC), a Source MAC address (SMAC), VLAN tags, Ethertype, Request, and Frame Check Sequence (FCS). The DMAC must be a broadcast or multicast destination to circumvent the flooding disablement. The SMAC must be the CPE/NID application MAC address, and the VLAN tag must match the classification criteria for the CPE/NID application's service.

New Protocol

Figure 7:
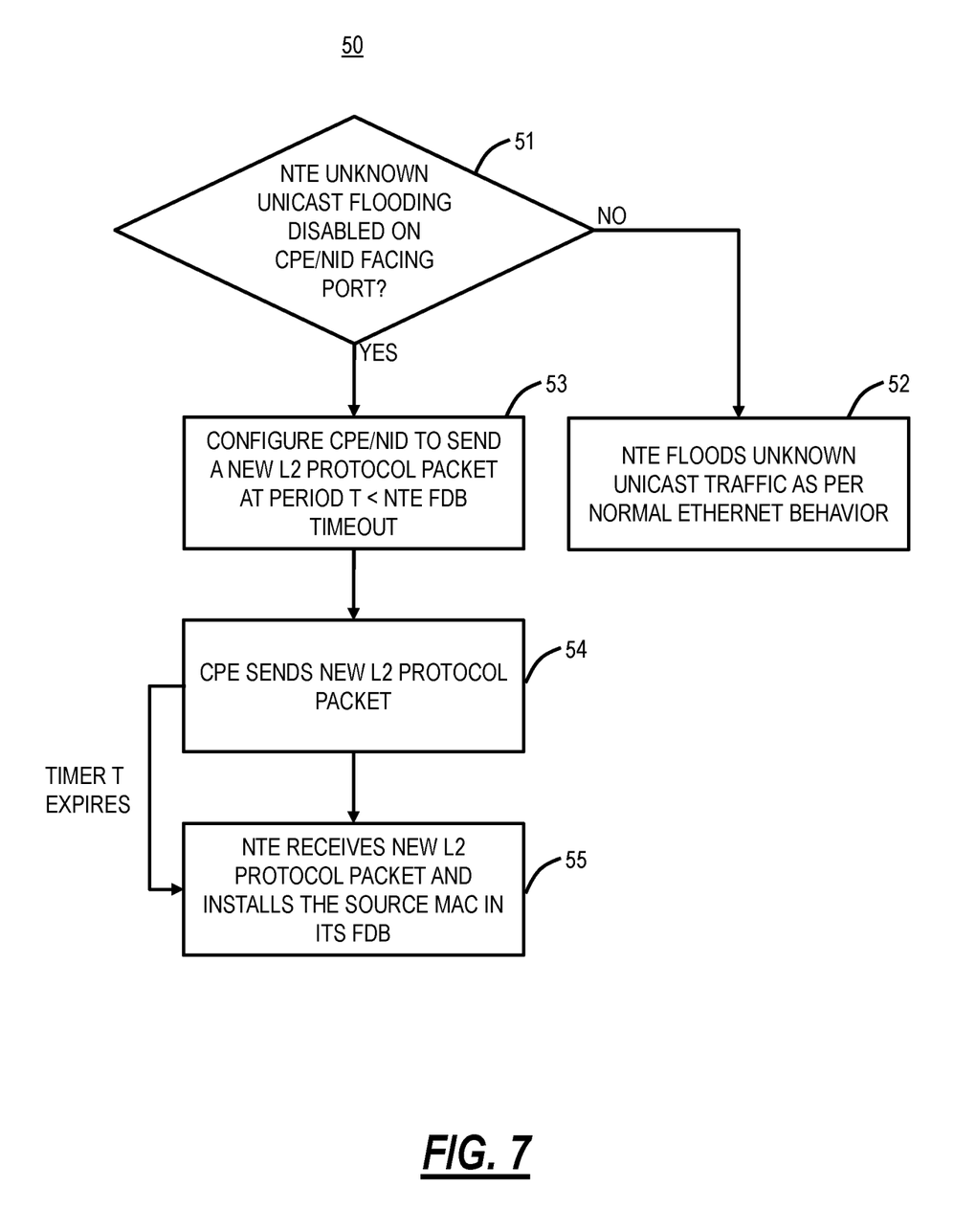
FIG. 7 is a flowchart of a process where the application on the CPE/NID is enabled to push its application MAC to the NTE.

Here, a new protocol is presented that pushes (from CPE/NID to NTE) or solicits/pulls (from NTE to CPE/NID) FDB learning of OAM related unicast MAC addresses so that unicast mac flooding is unnecessary while maintaining security. FIG. 7 is a flowchart of a process 50 where the application on the CPE/NID is enabled to push its application MAC to the NTE. The process 50 includes a new protocol initiated by the application when the application is enabled to "push" the application MAC to the NTE. This can be achieved by a "lead packet" that is sent upon CPE/NID application enablement and is resent periodically at an interval less than the FDB MAC learning timeout. This new protocol lead packet may have a unique Ethertype field value assigned. Specifically, the new protocol packet has a unique Ethertype where the packets are sent explicitly for the purpose of installing MAC addresses in the FDBs of the NTEs. The application source MAC may be the new protocol packet source MAC or may be present in a TLV of the new protocol packet. The new protocol packet is an Ethernet protocol packet with a dedicated Ethertype for pre-populating the source MAC address for the application.

The process 50 includes determining if NTE unknown unicast flooding is disabled on a CPE/NID facing port (step 51), and, if not, the NTE floods unknown unicast traffic as per normal Ethernet behavior (step 52), i.e., there is no need for the new protocol packets. If unknown unicast flooding is disabled (step 51), the process 50 includes configuring the CPR/NID to send periodic new protocol packets at a period T (T is a time value) which is less than the NTE forwarding database (FDB) timeout (step 53). Here, when the application requiring an application specific MAC address is enabled, the application sends new protocol packets using the CPE/NID application MAC as the source MAC, and any other fields that matches the classification criteria of the CPE/NID application's service (for example, a specific VLAN ID (VID)) (step 54). The process 50 includes the NTE receiving the new protocol packet and installing the source MAC in its FDB (step 55). The steps 54, 55 are repeating every T time.

Figure 8:
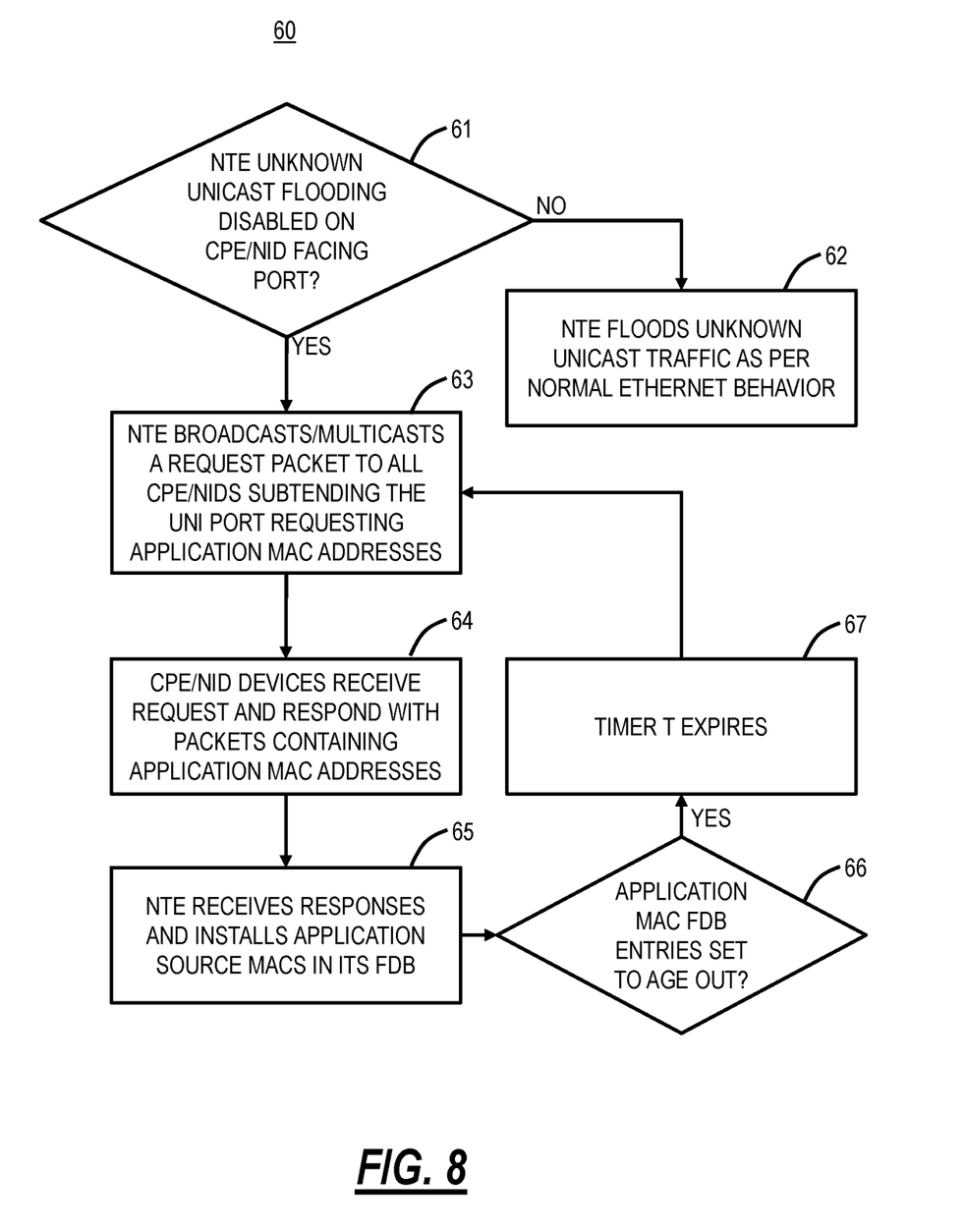
FIG. 8 is a flowchart of a process where the NTE is configured to solicit/pull addresses from any device receiving the messages in the new protocol.

FIG. 8 is a flowchart of a process 60 where the NTE is configured to solicit/pull addresses from any device receiving the messages in the new protocol. Here, the new protocol is initiated by the NTE to "pull" addresses from anyone receiving the message (there is also a response message in this type of protocol—whereas the process 50 only needs the one message in the new protocol). The "pull request" could be sent out of the port on which unknown unicast flooding has been disabled, at the time the flooding is disabled, and/or whenever the port goes up/down.

The process 60 includes determining if NTE unknown unicast flooding is disabled on a CPE/NID facing port (step 61), and, if not, the NTE floods unknown unicast traffic as per normal Ethernet behavior (step 62), i.e., there is no need for the new protocol packets. If unknown unicast flooding is disabled (step 61), the process 60 includes configuring the NTE to broadcast/multicast a request packet to all CPE/NIDs subtending the UNI port requesting application MAC addresses (step 63). The CPE/NIDs devices receive the request and respond with response packets containing application MAC addresses (step 64). The NTE receives the responses and installs the associated application source MAC addresses in its FDB (step 65). As the application MAC address in the FDB entries age out (step 66) after a time T (step 67), the NTE repeats the step 63.

Figure 9:
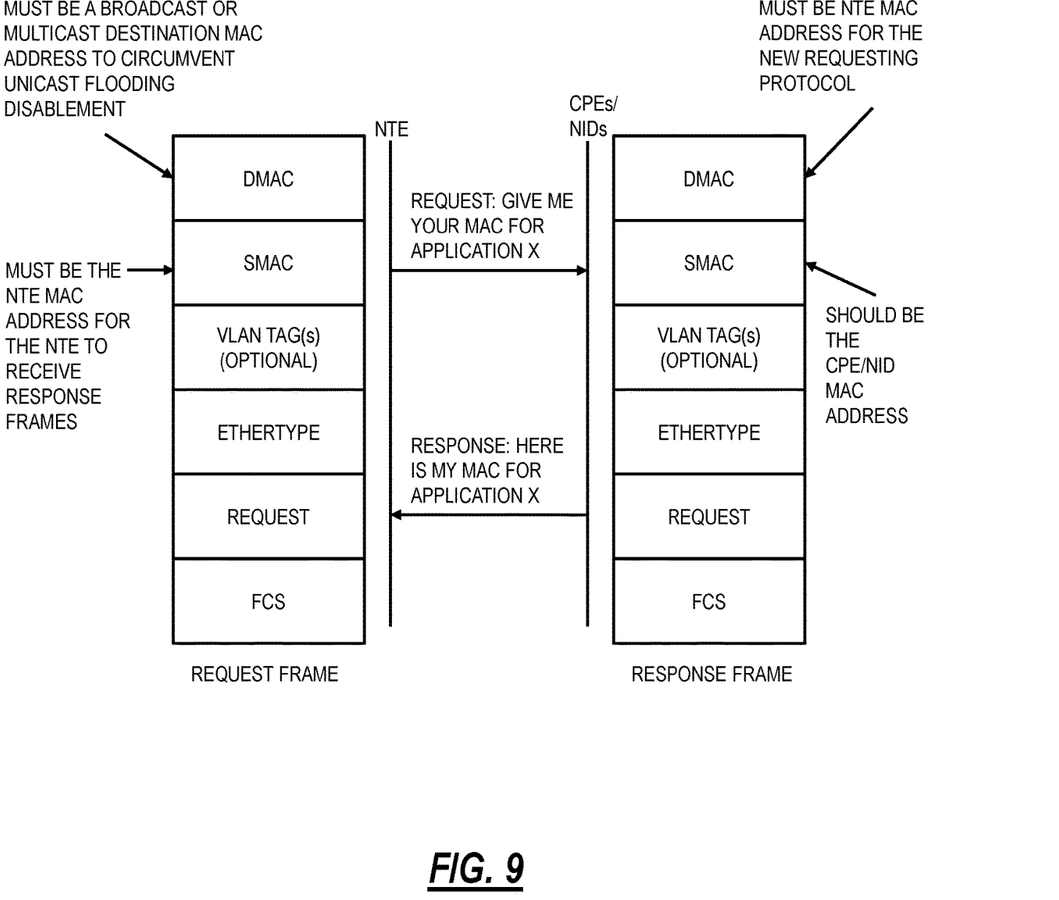
FIG. 9 is a block diagram of the pull request protocol of the process of FIG. 8 to request application MAC addresses of all CPE/NIDs reachable on the layer 2 network.

FIG. 9 is a block diagram of the pull request protocol of the process 60 to request application MAC addresses of all CPE/NIDs reachable on the layer 2 network. The Ethernet frames are similar to the Ethernet frame in FIG. 6 with a Request frame and a Response frame. The DMAC of the request frame must be a broadcast or multicast destination MAC address to circumvent the unicast flooding disablement. The SMAC of the request frame must be the NTE MAC address for the NTE to receive response frames. The DMAC of the response frame must be the NTE MAC address for the new request protocol. The SMAC of the response frame should be the CPE/NID MAC address.

Node

Figure 10:
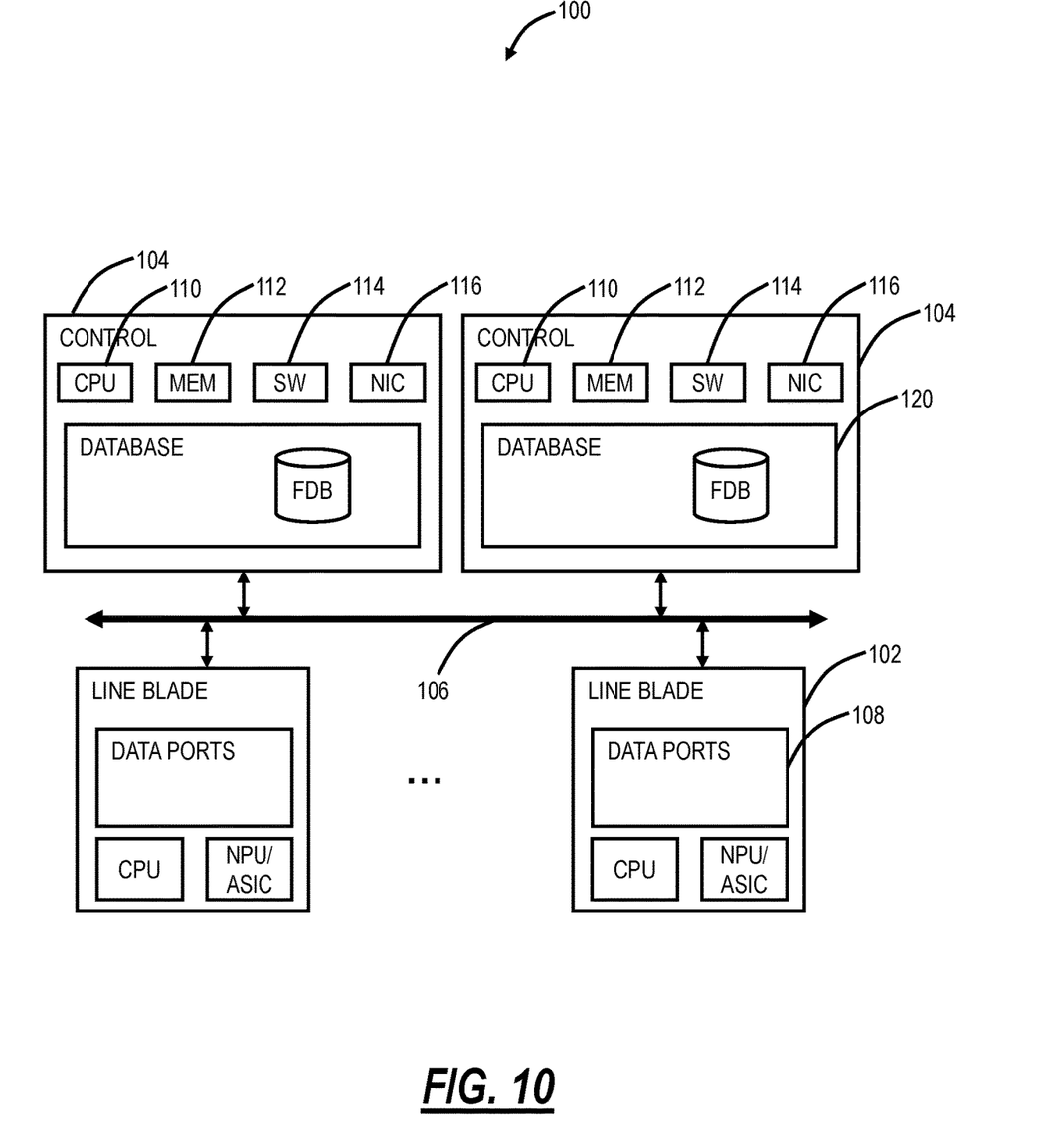
FIG. 10 is a block diagram of an implementation of a node.

FIG. 10 is a block diagram of an implementation of a node 100. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include an FDB that may be populated as described herein. In this embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 11:
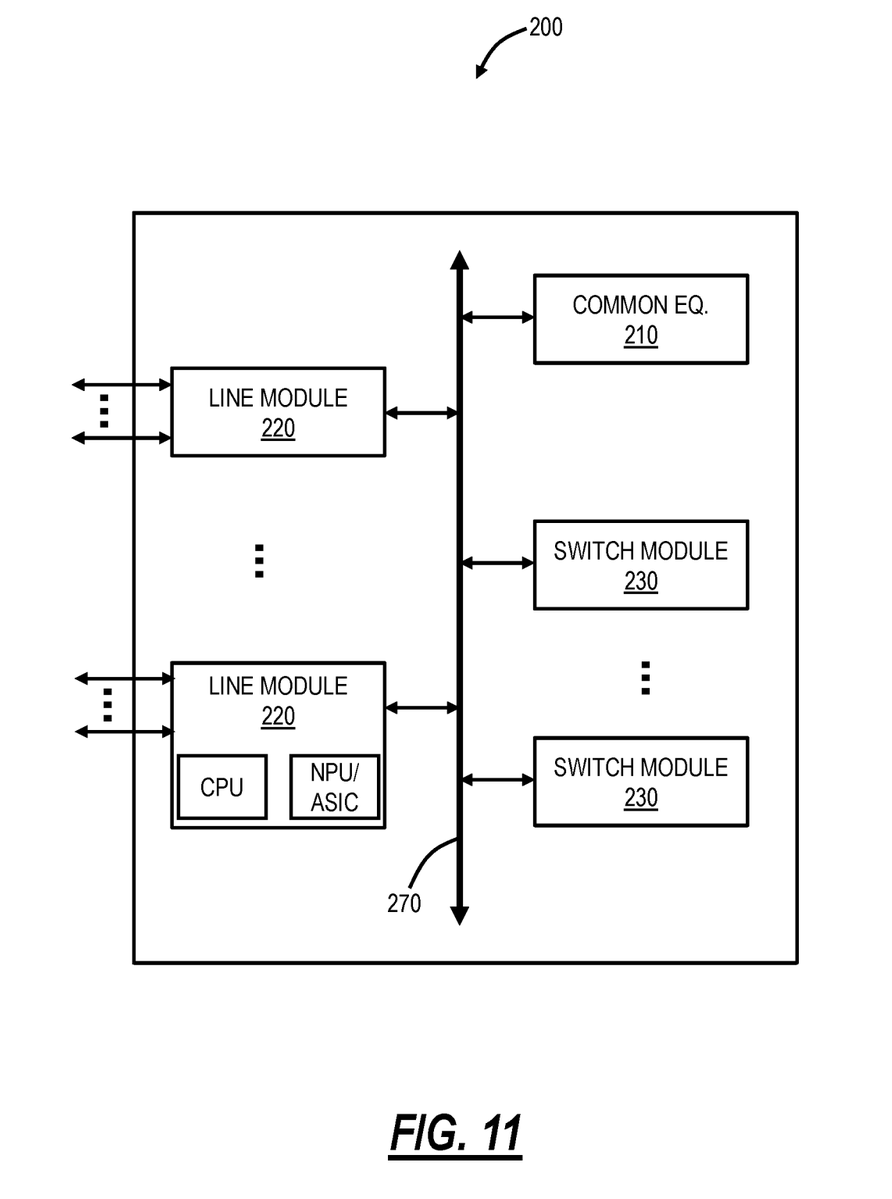
FIG. 11 is a block diagram of another implementation of a node.

FIG. 11 is a block diagram of another implementation of a node 200. For example, the node 100 can be a dedicated switch whereas the node 200 can be a multiservice platform. In an embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the node 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc. In the context of the systems and methods described herein, the node 200 includes packet switching with metering in addition to any other functionality.

In an embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity, etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In the context of the systems and methods described herein, the node 100 includes packet metering which can be performed by one or more meters, implemented in circuitry and located on the line blade 102, the control blade 104, in the switching fabric at some point, etc. Similar to the node 100, the node 200 includes packet switching through the line modules 220 and/or the switch modules 230. The node 200 includes packet metering which can be performed by one or more meters, implemented in circuitry and located on the line modules 220, the switch modules 230, the common equipment 210, etc. Specifically, the process 50 can be implemented in circuitry, logic, hardware, firmware, software, and/or a combination thereof in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   in a node having a plurality of Media Access Control (MAC) addresses with one MAC address for application designated as a source MAC address and with the node in communication with Network Termination Equipment (NTE) via a User-Network Interface (UNI) of the NTE, configuring the node for transmission of a packet with the source MAC address to the NTE via the UNI to enable the NTE to learn the source MAC address and pre-populate the source MAC address in a forwarding database in the NTE when unicast flooding of unknown MAC addresses is disabled in the NTE in a direction from a Network-Network Interface of the NTE to the UNI; and
   transmitting the packet with the source MAC address to the NTE at periodic time intervals while the NTE has unicast flooding of unknown MAC addresses disabled in the NNI-to-UNI direction such that the NTE receives the packet to learn the source MAC address and pre-populates the source MAC address in its forwarding database to enable reachability to the node via the NTE while the NTE has unicast flooding of unknown MAC addresses disabled in the NNI-to-UNI direction, wherein the periodic time intervals are less than a timeout value associated with the forwarding database.

2. The method of claim 1, wherein the Media Access Control (MAC) addresses include a chassis MAC address and the source MAC address designating the MAC address for the application.

3. The method of claim 1, wherein the packet is a no-operation packet which requires no processing by the NTE except installation of the source MAC address designating the MAC address for the application.

4. The method of claim 1, wherein each of the periodic time intervals is an age out time for entries in the forwarding database.

5. The method of claim 1, wherein the packet further includes classification fields based on the application including a Virtual Local Area Network Identifier (VID).

6. The method of claim 1, wherein the packet is an Address Resolution Protocol (ARP) probe with arbitrary Internet Protocol (IP) addresses.

7. The method of claim 1, wherein the packet is an existing layer 2 broadcast or multicast protocol packet with a vendor-specific operations code.

8. The method of claim 1, wherein the packet is a Link Layer Discovery Protocol (LLDP) frame with a Type-Length-Value (TLV) to advertise the source MAC address for the application.

9. The method of claim 1, wherein the packet is an Ethernet protocol packet with a dedicated Ethertype for pre-populating the source MAC address designating the MAC address for the application.

10. A node comprising:
a plurality of ports including a port in communication with Network Termination Equipment (NTE) via a User-Network interface (UNI) of the NTE;
a switching fabric between the plurality of ports; and
a controller including a forwarding database, wherein the node has a plurality of Media Access Control (MAC) addresses with one MAC address for an application designated as a source MAC address, and wherein the controller is configured to
responsive to the application and while the NTE has flooding disabled, cause transmission of a packet with the source MAC address to the NTE via the UNI at periodic time intervals when unicast flooding of unknown MAC addresses is disabled in the NTE in a direction from a Network-Network Interface of the NTE to the UNI to enable the NTE to learn the source MAC address and pre-populate the source MAC address in its forwarding database to enable reachability to the node via the NTE while the NTE has unicast flooding of unknown MAC addresses disabled in the NNI-to-UNI direction, wherein the periodic time intervals are less than a timeout value associated with the forwarding database of the NTE.

11. The node of claim 10, wherein the Media Access Control (MAC) addresses include a chassis MAC address and the source MAC address designating the MAC address for the application.

12. The node of claim 10, wherein the packet is a no-operation packet which requires no processing by the NTE except installation of the source MAC address designating the MAC address for the application.

13. The node of claim 10, wherein each of the periodic time intervals is an age out time for entries in the forwarding database.

14. The node of claim 10, wherein the packet further includes classification fields based on the application including a Virtual Local Area Network Identifier (VID).

15. The node of claim 10, wherein the packet is an Address Resolution Protocol (ARP) probe with arbitrary Internet Protocol (IP) addresses.

16. The node of claim 10, wherein the packet is an existing layer 2 broadcast or multicast protocol packet with a vendor-specific operations code.

17. The node of claim 10, wherein the packet is a Link Layer Discovery Protocol (LLDP) frame with a Type-Length-Value (TLV) to advertise the source MAC address for the application.

18. The node of claim 10, wherein the packet is an Ethernet protocol packet with a dedicated Ethertype for pre-populating the source MAC address designating the MAC address for the application.

19. A Network Termination Equipment (NTE) device comprising:
a Network-Network Interface (NNI);
a plurality of ports including a User-Network Interface (UNI) connected to a node, wherein flooding is disabled on the UNI, and wherein the node has a plurality of Media Access Control (MAC) addresses with one MAC address for an application designated as a source MAC address;
a switching fabric between the plurality of ports; and
a controller including a forwarding database, and wherein the controller is configured to
receive a packet with the source MAC address at periodic time intervals from the node to enable the controller to record the source MAC address in the forwarding database while having unicast flooding of unknown MAC addresses disabled in an NNI-to-UNI direction, and
install the source MAC address for the application, while having unicast flooding of unknown MAC addresses disabled in the NNI-to-UNI direction, to pre-populate the forwarding database;
wherein the periodic time intervals are less than a timeout value associated with the forwarding database.

20. The NTE device of claim 19, wherein the controller is further configured to
periodically receive the packet, while having unicast flooding of unknown MAC addresses disabled in the NNI-to-UNI direction, as the installed source MAC address ages out.

* * * * *